Patented Nov. 24, 1931

1,832,987

UNITED STATES PATENT OFFICE

LESTER KIRSCHBRAUN, OF LEONIA, NEW JERSEY, ASSIGNOR TO THE FLINTKOTE COMPANY, OF BOSTON, MASSACHUSETTS, A CORPORATION OF MASSACHUSETTS

BITUMINOUS EMULSIONS AND METHOD OF PRODUCING SAME

No Drawing. Application filed July 24, 1929. Serial No. 380,773.

This invention relates to aqueous emulsions of bituminous materials and to a novel method of producing same. The invention is more particularly concerned with the production of aqueous emulsions of normally non-fluid bitumens or the like, such as asphalts, of a melting range from 100° F to 200° F. These bitumens may be either natural or artificial asphalt, or a prepared asphaltic cement, coal tar pitch, or pitch such as resin and the like, all of which, as is well known, are naturally adhesive at normally atmospheric temperatures. The bitumen may be either used as it is naturally, or with tempering oils, such as petroleum residuum, linseed oil, and analogous oils.

Emulsions of bitumens of this character are being commercially produced with the aid of certain types of emulsifying agents, the emulsification and subdivision of the bitumen being effected by agitation thereof in a suspension of the emulsifying agent or of emulsifying agent and quantities of previously prepared emulsion, under conditions which attenuate the bitumen into fine threads or filaments which eventually, under the continued agitation, become broken apart or separated into finely divided particles dispersed in the aqueous medium. In order successfully to emulsify substantial quantities of bitumen in this way, it is essential that the suspension medium or bath in which emulsification takes place, shall be of a viscosity sufficient to provide the internal friction necessary to effect attenuation and subdivision of the bitumen. Numerous emulsifying agents capable of functioning in this way are known, among them being various grades of clay, metallic oxides, bentonite, talc, and in general, colloidal mineral powders that can suspend in a form of thick paste with water.

I have found, however, that there are certain colloids that act quite efficiently as a protective colloid for bitumens of the character described and which would, therefore, be highly desirable as emulsifying agents. Thus, for example, tannic acid functions as a protective colloid for bitumen, but by reason of the fact that this agent does not form with water a suspension of such viscosity as will afford the necessary internal friction for rapid attenuation and subdivision of the bitumen, it cannot commercially be used to produce emulsions or dispersions of material such as asphalt in the manner described. I have found, however, in accordance with the present invention, that material such as tannic acid can be rendered effective as emulsifying agents if the tannic acid is previously combined with finely divided solids so as to produce a pasty mass or suspension with water, such that the requisite internal friction for efficient emulsification will be available. For this purpose, various finely divided solids may be employed, though preferably I employ finely divided solids which are more readily wetted by asphalt or other bitumen to be emulsified than by water.

In carrying out the invention I have combined two parts by weight of asbestine of a fineness sufficient to pass through a sieve of 200 mesh, with one part by weight of tannic acid, with the result that the mixture when combined with water, produced a sufficiently viscous plastic mass to effect emulsification of asphalt having a melting point of about 140° F. The emulsion thus produced contained about 12 parts of asphalt to one part of the emulsifying media and about 40% of water in the external phase.

In another embodiment of the invention, similar proportions of lamp black and tannic acid were combined and formed into a pasty mass with water, which was then employed as an emulsifying media for asphalt of a melting point of 110° F., the emulsion in this case containing asphalt in the ratio of 20 parts thereof to one part of the emulsifying media and about 40 to 45% of water.

In still another embodiment of the invention, I have used a very hard bitumen of the nature of gilsonite, by grinding the hard bitumen, preferably in a ball mill and in the presence of about an equal weight of tannic acid, the latter serving to peptize the gilsonite. The powdered gilsonite when thus combined with the tannic acid and formed into a pasty mass with water, provides the emulsifying media of the necessary internal friction to emulsify bitumen of 100 to 200° F. melting point, the resulting emulsion containing about 15 parts of the emulsified asphalt to one part of the emulsifying media and about 40% of water.

It will be seen, therefore, that, by my invention, I provide a means for emulsifying bitumens with highly desirable agents which normally do not form with water a suspension of sufficient viscosity to provide internal friction of the character necessary to produce substantial emulsification of bitumen of this character by attenuation. The emulsions as produced by my invention possess numerous desirable properties rendering them very suitable for use in various industrial applications. Thus, for example, the emulsions are stable against acidic as well as basic electrolytes; are fairly completely suspendable and they can be made with a relatively low water content and with a very small particle size. Furthermore, when the emulsion is applied in the form of a thin layer or film, coalescence ensues in materially less time than in the case of certain other types of emulsions. Where powdered gilsonite is employed in conjunction with tannic acid as above described, a film of increased hardness results upon the elimination of the water from a layer of the emulsion, and since the gilsonite is soluble in asphalt and in time fluxes therewith, the water-free film contains substantially no foreign solids which may tend to impair the water-resistance of the film.

By the term "tannic acid" as used herein, I mean to include any equivalent protective colloid functioning as does tannic acid to permit fine grinding of solid materials and/or to peptize finely divided substances.

I claim as my invention:

1. The process of producing emulsions of bitumen-pitch type materials, which comprises grinding a relatively hard bitumen in the presence of tannic acid so as to produce a powdered mass of the bitumen peptized with the tannic acid, making an aqueous paste of said mass and employing the aqueous paste as an emulsifying medium for bitumen-pitch type material.

2. The process of producing emulsions of bitumen-pitch type materials, which comprises mixing tannic acid with finely divided solid material of a character substantially readily wetted by the bitumen-pitch material and in quantities sufficient to produce a mixture forming a viscous plastic mass with water, and thereafter emulsifying bituminous material with an aqueous paste of said mixture.

3. The process of producing emulsions of bitumen-pitch type materials, which comprises mixing tannic acid with finely divided solid material soluble in the bitumen-pitch material to be emulsified in quantities sufficient to produce a mixture forming a viscous plastic mass with water, and thereafter emulsifying bituminous material with an aqueous paste of said mixture.

4. The process of producing emulsions of bitumen-pitch type materials, which comprises mixing tannic acid with finely divided solid material, soluble in the bitumen-pitch material to be emulsified, in quantities sufficient to produce a mixture forming a viscous plastic mass with water and of a character more readily wetted by the bitumen-pitch material to be emulsified than by water, and thereafter emulsifying bituminous material with an aqueous paste of said mixture.

5. The process of producing emulsions of bitumen-pitch type materials, which comprises mixing tannic acid with gilsonite in quantities sufficient to produce a mixture forming a viscous plastic mass with water, and thereafter emulsifying bituminous material with an aqueous paste of said mixture.

6. The process of producing emulsions of bitumen-pitch type materials, which comprises mixing tannic acid with lamp black in quantities sufficient to produce a mixture forming a viscous plastic mass with water, and thereafter emulsifying bituminous material with an aqueous paste of said mixture.

7. The process of producing emulsions of bitumen-pitch type materials, which comprises mixing tannic acid with finely divided asbestine in quantities sufficient to produce a mixture forming a viscous plastic mass with water, and thereafter emulsifying bituminous material with an aqueous paste of said mixture.

In testimony whereof I affix my signature.

LESTER KIRSCHBRAUN.